United States Patent [19]

Naritomi et al.

[11] Patent Number: 5,149,589
[45] Date of Patent: Sep. 22, 1992

[54] THERMOPLASTIC ELASTOMER COMPOSITION OF EXCELLENT FUSION BOND PROPERTY

[75] Inventors: Masanori Naritomi, Urayasu; Noritaka Ogawa, Tokyo, both of Japan

[73] Assignee: Taisei Purasu Co., Ltd., Japan

[21] Appl. No.: 578,337

[22] Filed: Sep. 6, 1990

[30] Foreign Application Priority Data

Sep. 13, 1989 [JP] Japan .................................. 1-235620

[51] Int. Cl.$^5$ ........................ B32B 27/28; B32B 27/36
[52] U.S. Cl. .................................. 428/412; 428/475.2; 428/480; 428/483; 428/521; 428/522; 525/92; 525/165; 525/177; 525/437; 525/440
[58] Field of Search ............... 428/521, 483, 522, 480, 428/475.2, 412; 525/437, 92, 177, 165, 440

[56] References Cited

U.S. PATENT DOCUMENTS 3,927,244  12/1975  Ogura et al. ....................... 428/483

Primary Examiner—Paul J. Thibodeau
Assistant Examiner—D. S. Nakarani
Attorney, Agent, or Firm—Jordan B. Bierman

[57] ABSTRACT

A thermoplastic elastomer composition of excellent fusion bond property, which is useful to produce a composite molded product having a molded part that is made of a synthetic resin material, for example, an engineering plastic material, which has excellent mechanical strength, and a molded part that is made of a high-elasticity thermoplastic elastomer. The thermoplastic elastomer composition comprises 100 parts by weight of a thermoplastic elastomer and 25 to 185 parts by weight of a thermoplastic polyester elastomer.

6 Claims, No Drawings

THERMOPLASTIC ELASTOMER COMPOSITION OF EXCELLENT FUSION BOND PROPERTY

BACKGROUND OF THE INVENTION

1. Field of the Invention

The present invention relates to a thermoplastic elastomer composition of excellent fusion bond property, which is useful to produce a composite molded product having a molded part that is made of a synthetic resin material, for example, an engineering plastic material, which has excellent mechanical strength, and a molded part that is made of a high-elasticity thermoplastic elastomer.

2. Description of the Prior Art

Engineering plastics, which have excellent mechanical strength, are employed to produce mechanical parts or structural parts which are used under load. Various kinds of engineering thermoplastics are known, namely, polyamides, polyacetals, polycarbonates, modified polyphenylene oxides, polybutylene terephthalate, polysulfone, total aromatic polyester, etc.

In the meantime, molded articles formed from thermoplastic elastomers (TPE) are also produced by injection molding technique which gives particularly high productivity and used in a variety of applications. Examples of known thermoplastic elastomers of this type include styrene-butadiene elastomers, polyolefin elastomers, polyurethane elastomers, vinyl chloride elastomers and acrylic ester elastomers.

The injection molding process is capable of effectively forming molded articles having complex shapes and suitable for mass-production, and it is applied to the above-mentioned engineering plastics to efficiently produce various kinds of mechanical and structural parts.

There have recently been strong demands for increases in the level of performance and function of parts and members made of synthetic resin (plastic) materials. Under these circumstances, attempts have been made to combine together engineering plastics and thermoplastic elastomers, such as those mentioned above, to thereby form composite products. For this purpose, it is the most effective process to fusion-bond together these two different kinds of material into composite products by the injection molding technique that is a molding means common to the two different kinds of material.

However, the fusion bond properties of thermoplastic engineering plastics with respect to thermoplastic resins are, generally, not always good. The fusion bond properties with respect to thermoplastic elastomers (TPE) having high rubber elasticity are particularly inferior, so that these two materials cannot rigidly be bonded together. For this reason, when thermoplastic engineering plastics and thermoplastic elastomers (TPE) are to be combined together to produce composite products of high added value, e.g., composite parts or composite members, extremely unproductive bonding means must be adopted in the present state of art, e.g., a method wherein locking portions, for example, a combination of a recess and a projection, are provided at the joint of the two different kinds of material to thereby bond them together mechanically, or a method wherein an adhesive is applied to the joint of the two materials to bond them together.

The above-described conventional technique of forming a composite product from a thermoplastic engineering plastic and a thermoplastic elastomer (TPE) suffers, however, from the problems that the process is inefficient and the strength and sealing at the bond area are unsatisfactory.

More specifically, the method in which the two different kinds of material are mechanically bonded together through locking portions, for example, a combination of a recess and a projection, has the problems that the structure of the mold employed is complicated and the number of steps required for the process increases depending upon the structure. In view of the final shape of the composite molded product, it may be impossible to attain a strong composite structure. In addition, the mechanical bonding is incapable of attaining satisfactory waterproofness in the case of a composite molded product that is required to be waterproof, for example, water goggles in which the body portion is made of a rigid engineering plastic material and the edge portions that come into contact with the user's face are made of a soft and high-elasticity thermoplastic elastomer (TPE).

The method that uses an adhesive requires additional steps, for example, application of an adhesive, and suffers from the problem that the bond strength is low due to deterioration with time of the adhesive.

SUMMARY OF THE INVENTION

In view of the above-described circumstances, it is an object of the present invention to provide a thermoplastic elastomer composition of excellent fusion bond property which is essential for the production of a composite molded product, that is, a molded product formed by strongly bonding together a part made of a synthetic resin material such as an engineering plastic material and a part made of a thermoplastic elastomer (TPE) having high rubber elasticity.

It is another object of the present invention to strongly bond together a molded piece which is formed from a rigid synthetic resin material having excellent mechanical strength and a thermoplastic elastomer composition which is soft and has excellent fusion bond properties, thereby providing novel functional parts and high value-added parts: e.g., water goggles or other similar products (members) which are required to have high strength and waterproof performance, plastic telephone receivers, handles (grips) or other similar products in which the grip portion is made of a thermoplastic elastomer so as to be soft, plastic headlight covers for automobiles or other similar products in which a thermoplastic elastomer is attached to the edge portion of the cover as an integral portion thereof so as to serve as a packing member when the cover is installed, air shielding packings, valve parts, power transmitting parts such as flexible couplings and gears, input and output control buttons of various control devices, etc.

To these ends, the present invention provides a thermoplastic elastomer composition of excellent fusion bond property which is fusion-bonded to a molded piece that is formed from a rigid synthetic resin material to form a composite molded product, wherein the thermoplastic elastomer composition comprises:

(i) 100 parts by weight of a thermoplastic elastomer; and (ii) 25 to 185 parts by weight of a thermoplastic polyester elastomer.

DETAILED DESCRIPTION OF THE INVENTION

The structure of the present invention will be described below in detail. It should be noted that all the trade names mentioned hereinafter are phonetically transliterated.

The present invention resulted from the thorough investigation conducted to find a method of efficiently producing a composite product by joining a thermoplastic elastomer (TPE) which is soft and has high rubber elasticity to a molded piece which has previously been formed from a synthetic resin material, for example, a polycarbonate, and which has a higher hardness (JIS Shore hardness: A scale) than that of a molded piece formed from the thermoplastic elastomer.

In general, hardness is determined by factors such as the bonding strength between high polymer molecules, crystallizability, crosslinked structure and space network structure. Shore hardness, Mohs hardness and so forth are known as scales which are used to express the degree of hardness.

It should be noted that JIS is an abbreviation of Japanese Industrial Standard.

When a thermoplastic elastomer of high elasticity is merely fusion-bonded to a molded piece which has previously been formed from a synthetic resin material having a relatively high hardness by means, for example, of injection molding process, the bond strength of the resulting composite product is extremely low and thus unsatisfactory.

The most significant feature of the present invention resides in the use of a thermoplastic polyester elastomer in order to improve the strength of the bond between a molded piece formed from a synthetic resin material having a relatively high hardness and a high-elasticity and soft thermoplastic elastomer (TPE) by means of fusion bonding.

The present invention uses a thermoplastic polyester elastomer which has a hard segment and a soft segment. Well-known examples of this type of thermoplastic polyester elastomer are polyether-ester copolymers which have a polyester segment (hard segment) that is prepared from an aromatic dicarboxylic acid and a short-chain glycol and a polyether segment (soft segment) that is prepared from an aromatic dicarboxylic acid and a polyalkylene glycol (long-chain glycol). Polyester-ester type copolymers of which the soft segment is prepared using polycaprolactone are also known.

Typical thermoplastic polyester elastomers of the type described above are prepared by condensation polymerization and ester exchange reaction using dimethyl terephthalate, 1,4-butanediol and poly(oxytetramethylene) glycol as starting materials, these elastomers being represented by the formula:

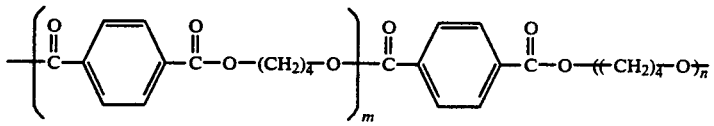

(wherein m and n represent degrees of polymerization)

It is not clear why a part consisting of a molded piece formed from a synthetic resin material having a relatively high hardness and a part consisting of a molded piece formed from a high-elasticity and soft thermoplastic elastomer are strongly bonded together through fusion bonding by the use of a thermoplastic polyester elastomer of the above formula. It is, however, considered that the high bond strength is obtained as the result that the hard segment, soft segment and functional groups such as OH and COOH of the thermoplastic polyester elastomer effectively interact with each other at the fusion bond area between the molded parts that are respectively formed from the two different kinds of material.

The properties of the above-described thermoplastic polyester elastomers vary with the ratio of the hard segment to the soft segment or the kinds of components of the segments. However, general features of the thermoplastic polyester elastomers are excellent flexing resistance, oil resistance, wear resistance and heat resistance. However, these thermoplastic polyester elastomers have a higher hardness than that of ordinary elastomers and are inferior in flexibility. In this regard, it is preferable to blend a thermoplastic elastomer, described later, with a thermoplastic polyester elastomer employed, to overcome the disadvantage.

The above-described thermoplastic polyester elastomers are marketed under the trade names, for example, of PELPLENE (P40H, P70B, P150B and P150M, manufactured by Toyo Spinning Co., Ltd.), GLYLAX (E-120, E-200, E-320 and E-500, manufactured by Dai-Nippon Ink & Chemicals, Inc.) and HYTREL (G-3548, 4057, 4047, 4767, 5557, 6347 and 7274, manufactured by Toray-Du Pont Industries, Inc).

A thermoplastic elastomer that is combined with the thermoplastic polyester elastomer will next be explained.

In the present invention, it is possible to use any thermoplastic elastomer component that provides a molded part having a higher elasticity and lower hardness than those of a molded part that is formed from a synthetic resin material (described later) which is to be combined therewith to form a composite molded product. Examples of such thermoplastic elastomers include a hydrogenated SBS block copolymer, an olefin elastomer such as EPR, a diene elastomer such as SBR, an urethane elastomer and a plasticized polyvinyl chloride of high elasticity. It is particularly preferable in order to obtain a composite molded product of high added value to employ a thermoplastic elastomer having a hardness (JIS Shore hardness: A scale) of from 35 to 70.

To prepare a thermoplastic elastomer composition of excellent fusion bond property from the above-described thermoplastic polyester elastomer component and thermoplastic elastomer component, the thermoplastic polyester elastomer component is used in an amount of 25 to 185 parts by weight per 100 parts by weight of the thermoplastic elastomer component in order to ensure the satisfactorily high fusion bond strength. More preferably, 40 to 60 parts by weight of the thermoplastic polyester elastomer and 100 parts by weight of a thermoplastic elastomer are uniformly blended together by mechanical means to form a blend in which the two components are insularly dispersed.

The thermoplastic elastomer composition of excellent fusion bond property that comprises the above-described thermoplastic polyester elastomer component and thermoplastic elastomer component is rigidly bonded by fusion bonding to a molded part that is formed from a synthetic resin material which has a higher hardness than that of the composition, thereby providing a useful composite molded product.

Examples of synthetic resin materials which may be combined with the thermoplastic elastomer composition are thermoplastic engineering plastics such as a polycarbonate, Nylon 11, Nylon 12, ABS resin and methacrylate resin and thermoplastic synthetic resins. It is preferable in order to obtain a composite molded product of high added value to select one from among the above-mentioned synthetic resin materials which has a hardness of 70 Shore A or more.

To carry out the process for rigidly bonding together by fusion bonding a molded part formed from a synthetic resin material having a relatively high hardness and a molded part formed from a thermoplastic elastomer composition of excellent fusion bond property, either one of the following two processes may be adopted. Namely, a composition consisting essentially of a thermoplastic elastomer of high rubber elasticity and a thermoplastic polyester elastomer is fusion-bonded to a molded piece which has previously been formed from a synthetic resin material having a relatively high hardness. Alternatively, the latter synthetic resin material is fusion-bonded to a molded piece which has previously been formed from the former thermoplastic elastomer composition.

It is possible to adopt any technical means for fusion-bonding together a molded part that is formed from a synthetic resin material having a relatively high hardness and a molded part formed from a thermoplastic elastomer composition of excellent fusion bond property. More specifically, it is possible to adopt any molding process in which fusion bonding conditions are set, for example, injection molding, extrusion molding, blow molding, calendering, compression molding, transfer molding, etc. Among them, injection molding process is preferable from the viewpoint of productivity.

The present invention will be described below in more detail by way of Examples. It should be noted that the present invention is in no way restricted to these Examples without departing from the gist of the invention.

EXAMPLE 1

A thermoplastic elastomer composition was prepared as follows:

100 parts by weight of S.E.B.S (hydrogenated SBS block copolymer, available from Mitsubishi Petro-Chemical Co., Ltd. under the registered trade name of "RABALON" T3427C) employed as a thermoplastic elastomer and 55 parts by weight of a thermoplastic polyester elastomer (available from Dai-Nippon Ink & Chemicals, Inc. under the registered trade name of "GLYLAX" E-120) were uniformly blended to obtain a polymer blend in which the two components were insularly dispersed.

An experiment wherein the thermoplastic elastomer composition prepared as stated above was fusion-bonded to a molded piece of a polycarbonate to obtain a composite molded product was conducted.

More specifically, the body portion of water goggles was formed from a polycarbonate by injection molding process in advance, and the above-described thermoplastic elastomer composition was fusion-bonded to the polycarbonate body portion of the water goggles by an injection molding means to form face contact portions of the goggles (the general structure of the water goggles being disclosed in Japanese Patent Post-Exam Publication No. 62-23577 (1987).

The injection molding conditions were as follows: nozzle temperature, 220° C.; cylinder temperature, 180° C.; die bottom temperature, 140° C.; mold temperature, 50° C.; and injection pressure, 400 kg/cm$^2$.

The polycarbonate and the thermoplastic elastomer composition were strongly bonded together at the fusion bond area therebetween. The bond strength was the same as the tensile strength of the thermoplastic elastomer. In other words, the two molded parts of polycarbonate and S.E.B.S were completely fusion-bonded together.

Under the same conditions as the above, two other experiments were conducted with regard to polymer blends respectively comprising 100 parts by weight of the thermoplastic elastomer and 25 parts by weight of the thermoplastic polyester elastomer and 100 parts by weight of the former component and 185 parts by weight of the latter component. These two polymer blends were also completely fusion-bonded to the polycarbonate body portion of water goggles.

EXAMPLE 2

A thermoplastic elastomer composition was prepared in the same way as in Example 1 except that a thermoplastic polyester elastomer (available from Toray-Du Pont Industries, Inc. under the registered trade name of "HYTREL" G-3548; hardness of 35 Shore D) was used in place of "GLYLAX" E-120. In this case also, the surfaces of the polycarbonate molded part and the polymer blend molded part were completely fusion-bonded together.

EXAMPLE 3

A thermoplastic elastomer composition was prepared in the same way as in Example 1 except that TPO (thermoplastic olefin elastomer, available from Mitsui Petrochemical Industries, Ltd. under the registered trade name of "MILASTOMER" 5030N) was used in place of S.E.B.S and a thermoplastic polyester elastomer (available from Toyo Spinning Co., Ltd. under the registered trade name of "PELPLENE" P40H) was used in place of "GLYLAX" E-120. In this case also, the surfaces of the polycarbonate molded part and the polymer blend molded part were completely fusion-bonded together.

EXAMPLE 4

A thermoplastic elastomer composition was prepared in the same way as in Example 1 except that styrene-butadiene-styrene (SBS, available from ARON KASEI Co., Ltd. under the trade name of "ELASTOMER AR" AR140) was used in place of S.E.B.S. In this case also, the surfaces of the polycarbonate molded part and the polymer blend molded part were completely fusion-bonded together.

EXAMPLE 5

A thermoplastic elastomer composition was prepared in the same way as in Example 1 except that a thermoplastic elastomer (available from ARON KASEI Co., Ltd. under the trade name of "ARON AR" 740BK) was used in place of S.E.B.S. In this case also, the surfaces of the polycarbonate molded part and the polymer blend molded part were completely fusion-bonded together.

EXAMPLE 6

An injection molding process was carried out in the same way as in Example 1 except that an ABS resin (acrylonitrile butadiene-styrene resin, available from Electro Chemical Industry Co., Ltd. under the trade name of "DENKA ABS" GR-1000) was used in place of polycarbonate. In this case also, the surfaces of the ABS resin molded part and the polymer blend molded part were completely fusion-bonded together with a satisfactorily high bond strength.

EXAMPLE 7

An injection molding process was carried out in the same way as in Example 1 except that a methacrylate resin (available from Mitsubishi Rayon Company Limited under the trade name of "ACRYLPET") was used in place of polycarbonate. In this case also, the surfaces of the methacrylate resin molded part and the polymer blend molded part were completely fusion-bonded together with a satisfactorily high bond strength.

EXAMPLE 8

The process for producing a composite molded product according to the present invention was applied to a process for molding a mechanical part such as that disclosed in Japanese Patent Application Laid-Open Publication (KOKAI) No. 57-144737 (1982). In place of the polycarbonate molded piece in Example 1, a mechanical part previously molded out of nylon 11 was placed in the mold. The same polymer blend that employed in Example 1 was fusion-bonded to the molded mechanical part through injection molding process under the same conditions as in Example 1. The surfaces of the molded mechanical part and the polymer blend molded part were completely fusion-bonded together.

EXAMPLE 9

An injection molding process was carried out in the same way as in Example 7 except that nylon 12 was used in place of nylon 11. In the case also, the surfaces of the molded mechanical part and the polymer blend molded part were completely fusion-bonded together.

Thus, the thermoplastic elastomer composition of excellent fusion bond property according to the present invention enables a thermoplastic engineering plastic material and a thermoplastic elastomer to be strongly fusion-bonded together by an efficient fusion bonding means.

In particular, a thermoplastic elastomer which is soft and has high rubber elasticity, such as hydrogenated SBS block copolymer, can be strongly fusion-bonded to an engineering plastic material having a relatively high hardness, such as a polycarbonate, by fusion bonding, which is a simple and easy means. Therefore, it is possible to provide effectively and efficiently composite molded products having novel performance and functions.

What is claimed is:

1. A thermoplastic elastomer composition which is fusion bonded to a molded piece that is formed from a rigid synthetic resin material to form a composite molded product, wherein said thermoplastic elastomer composition comprises;
   (1) 100 parts by weight of a thermoplastic elastomer selected from the group consisting of a hydrogenated SBS block copolymer, olefin elastomer, diene elastomer, and urethane elastomer, and
   (2) 25 to 185 parts by weight of a thermoplastic polyester elastomer, said thermoplastic polyester elastomer being a polyether-ester copolymer which has a polyester segment that is prepared from an aromatic dicarboxylic acid and a short-chain glycol and a polyether segment that is prepared from an aromatic dicarboxylic acid and a polyalkylene glycol.

2. A thermoplastic elastomer composition according to claim 1, wherein said synthetic resin material is one selected from among a polycarbonate, Nylon 11, Nylon 12, ABS resin and methacrylate resin.

3. The thermoplastic elastomer composition of claim 1 wherein said thermoplastic elastomer has a JIS A scale Shore hardness of 35 to 70.

4. The thermoplastic elastomer composition of claim 1 wherein said synthetic resin material has a JIS A scale Shore hardness of at least 70.

5. A thermoplastic elastomer composition which is fusion-bonded to a molded piece that is formed from a rigid synthetic resin material to form a composite molded product, wherein said thermoplastic elastomer composition comprises:
   (1) 100 parts by weight of a thermoplastic elastomer selected from the group consisting of a hydrogenated SBS block copolymer, olefin elastomer, diene elastomer, and urethane elastomer, and
   (2) 25 to 185 parts by weight of a thermoplastic polyester elastomer, wherein said thermoplastic polyester elastomer is a polyester-ester copolymer which has a polyester segment that is prepared from an aromatic dicarboxylic acid and a short-chain glycol and a polyester segment that is prepared from polycaprolactone.

6. The thermoplastic elastomer composition of claim 5 wherein said synthetic resin material is selected from the group consisting of polycarbonate, Nylon 11, Nylon 12, ABS resin and methacrylate resin.

* * * * *